No. 636,385. Patented Nov. 7, 1899.
J. B. HOWE.
SPEED GEARING FOR BICYCLES.
(Application filed Feb. 16, 1899.)
(No Model.) 3 Sheets—Sheet 1.
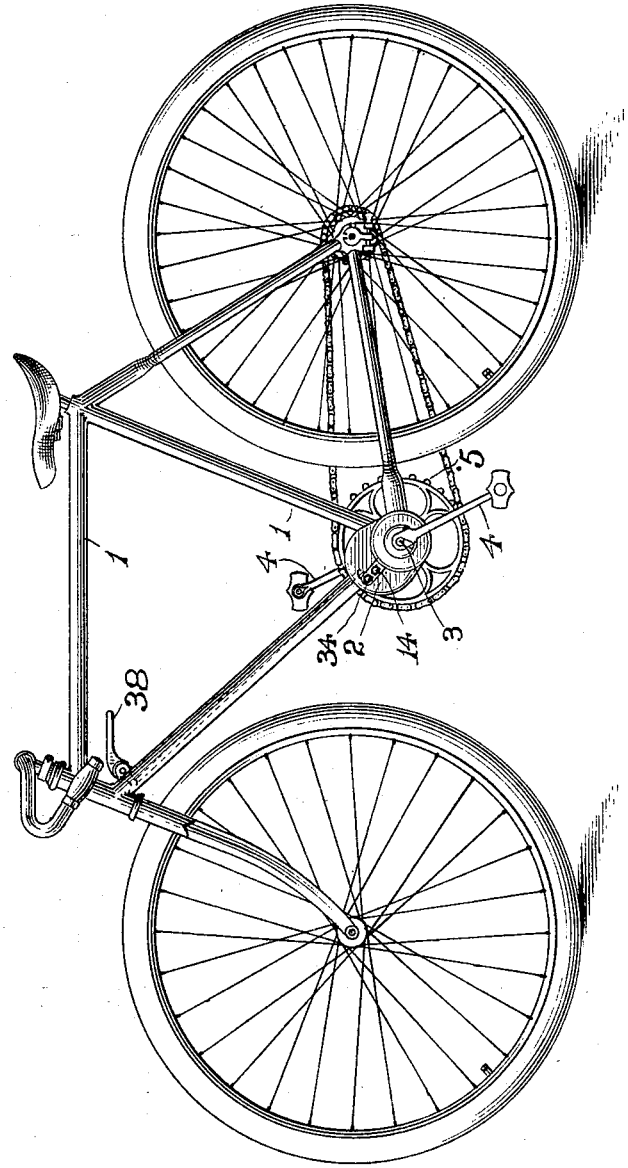
WITNESSES:
INVENTOR
J. B. HOWE
BY
ATTORNEY

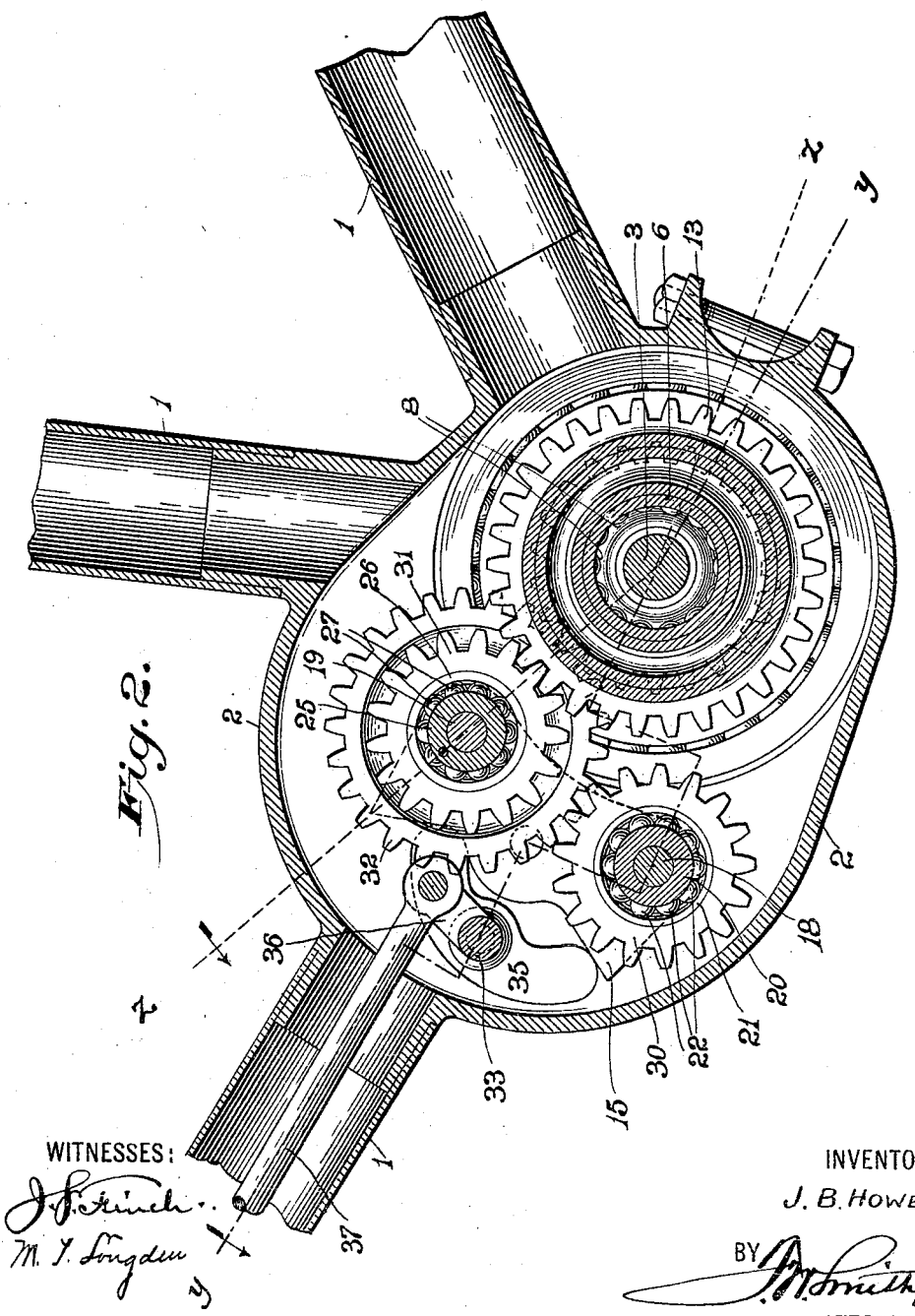

No. 636,385. Patented Nov. 7, 1899.
J. B. HOWE.
SPEED GEARING FOR BICYCLES.
(Application filed Feb. 16, 1899.)
(No Model.) 3 Sheets—Sheet 3.
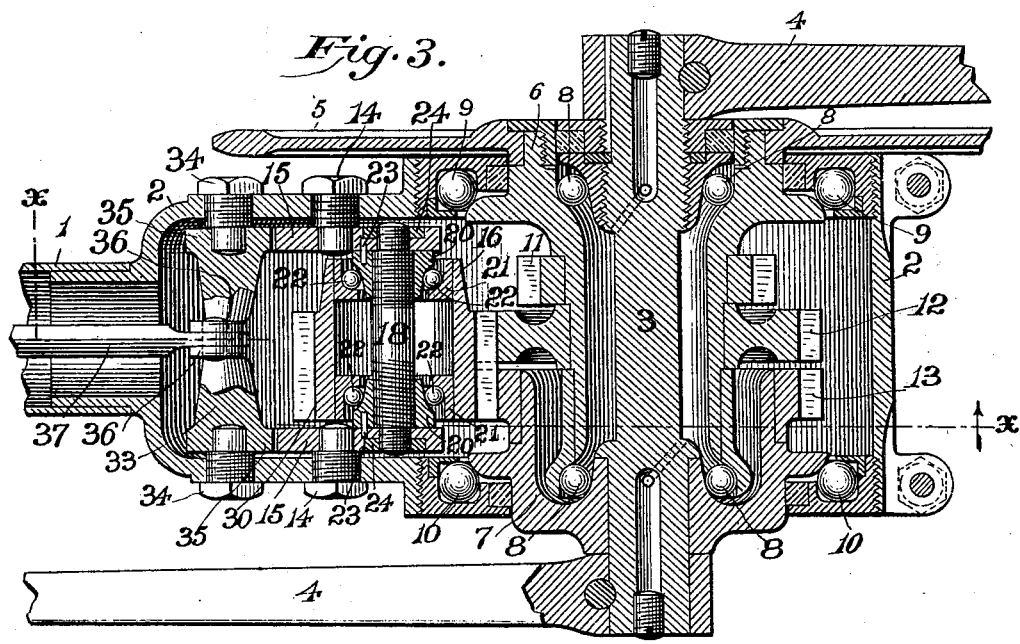
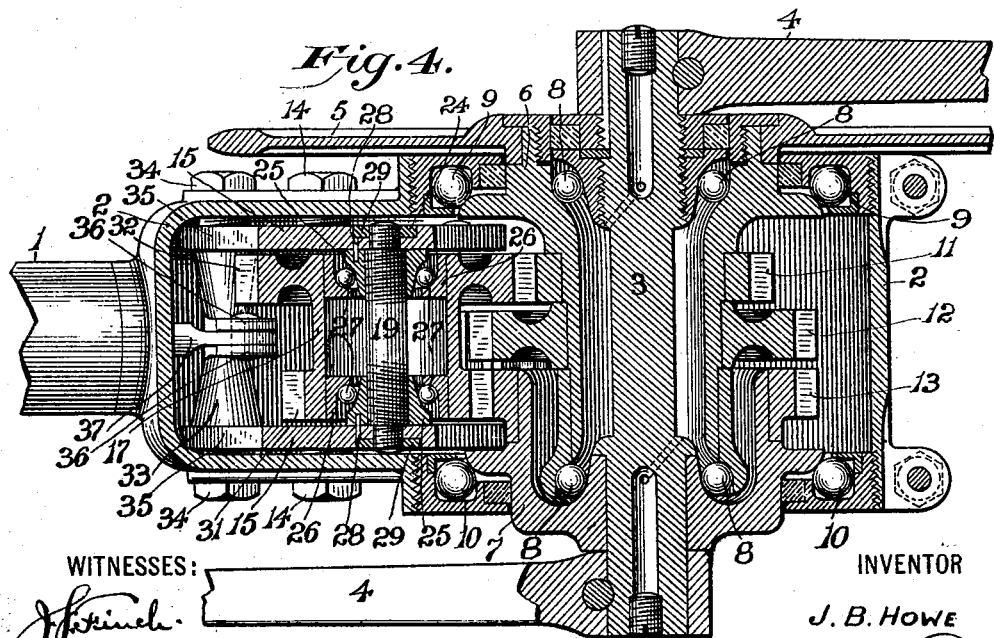
WITNESSES:
INVENTOR
J. B. HOWE
BY
ATTORNEY

UNITED STATES PATENT OFFICE.

JOHN B. HOWE, OF DANBURY, CONNECTICUT.

SPEED-GEARING FOR BICYCLES.

SPECIFICATION forming part of Letters Patent No. 636,385, dated November 7, 1899.

Application filed February 16, 1899. Serial No. 705,668. (No model.)

*To all whom it may concern:*

Be it known that I, JOHN B. HOWE, a citizen of the United States, residing at Danbury, in the county of Fairfield and State of Connecticut, have invented certain new and useful Improvements in Speed-Gearing for Bicycles; and I do hereby declare the following to be a full, clear, and exact description of the invention, such as will enable others skilled in the art to which it appertains to make and use the same.

My invention relates to certain new and useful improvements in bicycles, but more particularly has reference to the provision of change-speed gears, whereby the benefits of a high or of a low gear may be obtained instantly at the option of the rider.

The object of my invention is to provide a very simple and effective construction, while the friction and the weight are believed to be reduced to a minimum.

With these ends in view my invention consists in certain details of construction and combination of parts, such as will hereinafter be fully set forth and then specifically be designated by the claims.

In the accompanying drawings, which form a part of this application, Figure 1 is an elevation of a bicycle complete equipped with my improvement; Fig. 2, a section at the line $x\ x$ of Fig. 3; and Figs. 3 and 4 are sections, respectively, at the lines $y\ y$ and $z\ z$ of Fig. 2.

Similar numbers of reference denote like parts in the several figures of the drawings.

The matter of journaling parts by ball-bearings is so exceedingly simple and well known that in the description of the present invention I will not refer to such bearings by any detailed explanation, and I shall deem it sufficient to say in all instances that the part or parts referred to are journaled with ball-bearings.

My improvement accomplishes the end aimed at by doing away entirely with all friction-clutch devices which have heretofore proved so uncertain and unsatisfactory in their operation.

1 is the usual frame of a bicycle, and 2 is casing secured to the lower portion of the frame at the point where the cranks usually hang.

3 is the crank-shaft, and 4 the cranks, which shaft is hung in the casing and journaled in the manner presently to be explained.

5 is the sprocket, which is rigid on a hub 6, that projects inwardly into the casing and surrounds the crank-shaft, which latter has a hub 7 rigid therewith and extending within the casing around the free end of the hub 6.

Ball-bearings 8 are between the crank-shaft and hub 6 at each side of the casing, while ball-bearings 9 10 are respectively between the casing and the outside of these hubs 6 7.

It will of course be readily understood that ordinary mechanical skill is exercised in providing suitable bearing-rings or surfaces capable of adjustment; but, as I said before, I will enter into no detailed description in this respect.

The hub 6 has rigid therewith gears 11 12, the former of which is of less diameter than the latter, and the hub 7 has secured tightly thereon a gear 13 of the same size as the gear 12, and these two gears 12 13 are side by side, as shown at Figs 3 and 4.

From the foregoing description it will be readily understood that the crank-shaft and the sprocket are capable of independent movements and that the bearings for these two elements are in the same vertical planes at each side of the casing.

14 are pivot-studs driven through the sides of the casing, and around these studs are pivoted cam-plates 15, which are similar to each other in every respect. Between these cam-plates and on opposite sides of their pivotal points are journaled hubs 16 17, and I will refer briefly to the manner in which the journaling of these hubs is effected in order that the same may be clearly understood.

Referring respectively to Figs. 3 and 4, 18 19 are pins shouldered and threaded at their extremities and driven within the cam-plates, and each of these pins near its extremities has right and left handed threads. The right and left hand threads of the pin 18 take into bearing-rings 20, and bearing-blocks 21 are shrunk within the ends of the hub 16, and between these rings and blocks are ball-bearings 22, the rings being secured as against rotary movement by means of pins 23 extending into said rings from the inner faces of the cam-plates. By turning the pin 18 by means of any suitable screw-driver the bearing-rings 20 are adjusted in the usual manner, and nuts 24 are driven on the outer threaded ends of the pin to hold the same in position when a proper adjustment has once been secured. The right and left hand threads of the pin 19 take into bearing-rings 25, and bearing-blocks 26 are shrunk within the ends of the hub 17, and between these rings and blocks are ball-bearings 27, the rings being secured as against rotary movement by means of pins 28, extending into said rings from the inner faces of the cam-plates. By turning the pin 19 in the manner heretofore described with respect to the pin 18 the bearing-rings 25 are adjusted in the usual manner, and nuts 29 are driven on the outer threaded ends of this pin 19 to hold the same in position when a proper adjustment has once been secured.

The hub 16 carries a gear 30, which is opposite the gears 12 13 and which is wide enough to mesh with both these gears at the same time, while the hub 17 carries two gears 31 32, the former of which is the smaller and is capable of meshing with the gear 13, while the gear 32 is a larger gear and is capable of meshing with the small gear 11 on the hub 6.

33 is a rock-shaft pivoted within the casing by means of pivot-studs 34, the extremities of this shaft carrying cam-levers 35. 36 is a crank extending from this shaft, and to this crank is pivoted a rod 37, which extends preferably inside the frame of the bicycle and at its upper end is pivoted to a dog 38, which latter is in turn pivoted in any suitable manner to the frame. By operating this dog 38 the rod 37 is actuated to throw the cam-lever against the cam-plate either on one side or the other of the pivotal point of this plate, thus throwing the gear 30 into engagement with the gears 12 13 or throwing the gears 31 32 into engagement with the gears 13 11.

When the wide gear 30 is in engagement with the gears 12 13, the speed of the sprocket will of course be the same as the speed of the crank-shaft; but when the gears 31 32 are in engagement with the gears 13 11 the speed of the sprocket will be greater than that of the crank-shaft, and therefore any desired gear of the bicycle may be obtained by making the gears inside of the casing of the proper size.

The dog 38 may be operated so as to hold the several gears on the cam-plate out of engagement with the gears on the hubs 6 7, so that the rider may hold the crank-shafts stationary, either for the purpose of removing the motive power from his machine or for convenience in coasting, as may be desired.

Having thus described my invention, what I claim as new, and desire to secure by Letters Patent, is—

1. In a bicycle, the crank-shaft and the sprocket journaled independently and concentrically within a surrounding casing, the speed-gears moving in harmony with said sprocket, the gear carried by the crank-shaft and side by side with one of the first-named gears and of the same size, the cam-plates pivoted within said casing, the wide gear journaled between said plates on one side of the pivotal point thereof and capable of meshing with the two similar-sized gears previously mentioned, the double gear journaled between said plates on the other side of the pivotal point thereof and capable of meshing with the gear carried by the crank-shaft and the smaller gear moving in harmony with the sprocket-wheel, the pivoted cam-levers, and means controlled and operated by the rider for throwing said cam-levers against the cam-plates whereby the gears carried by said plates are engaged with or disengaged from the gears which move in harmony with the crank-shaft and sprocket, substantially as set forth.

2. In a bicycle, the combination of the crank-shaft and the sprocket journaled independently and concentrically within a surrounding casing, the large and small gears moving in harmony with said sprocket, the gear of the same size as the large sprocket-gear and carried by the crank-shaft side by side with said sprocket-gear, the wide gear and the double-speed gears suitably journaled and supported in proximity to the gears carried by said shaft and sprocket, and means controlled by the rider for effecting the engagement and disengagement of said wide gear with said same-sized gear and for effecting the engagement and disengagement of said double gear and the crank-shaft gear and small sprocket-gear, substantially as set forth.

3. In a bicycle, the combination of the crank-shaft and the sprocket journaled independently and concentrically within a surrounding casing, the speed-gears moving in harmony with said sprocket, the gear moving in harmony with the crank-shaft and side by side with one of the first-named gears of the same size, the wide gear and double gear journaled within and carried by a rocking element, and means controlled by the rider for effecting the rocking movements of said element, whereby the gears carried thereby are thrown into and out of engagement with the first-named gears, substantially as set forth.

In testimony whereof I affix my signature in presence of two witnesses.

JOHN B. HOWE.

Witnesses:
STEPHEN D. BUTLER,
NORMAN HODGE.